US012125999B2

(12) United States Patent
George et al.

(10) Patent No.: US 12,125,999 B2
(45) Date of Patent: Oct. 22, 2024

(54) TRAPEZOIDAL BATTERY MODULES

(71) Applicant: McLaren Automotive Limited, Woking (GB)

(72) Inventors: Sunoj Cherian George, Woking (GB); James Douglas McLaggan, Woking (GB); Elie Talj, Woking (GB)

(73) Assignee: McLaren Automotive Limited, Woking (GB)

( * ) Notice: Subject to any disclaimer, the term of this patent is extended or adjusted under 35 U.S.C. 154(b) by 744 days.

(21) Appl. No.: 17/277,251

(22) PCT Filed: Sep. 17, 2019

(86) PCT No.: PCT/GB2019/052609
§ 371 (c)(1),
(2) Date: Mar. 17, 2021

(87) PCT Pub. No.: WO2020/058696
PCT Pub. Date: Mar. 26, 2020

(65) Prior Publication Data
US 2022/0037717 A1 Feb. 3, 2022

(30) Foreign Application Priority Data
Sep. 18, 2018 (GB) ..................................... 1815187

(51) Int. Cl.
*H01M 10/6557* (2014.01)
*H01M 10/613* (2014.01)
(Continued)

(52) U.S. Cl.
CPC ...... *H01M 10/6557* (2015.04); *H01M 10/613* (2015.04); *H01M 10/625* (2015.04); *H01M 10/643* (2015.04); *H01M 50/107* (2021.01); *H01M 50/213* (2021.01); *H01M 50/258* (2021.01); *H01M 50/262* (2021.01); *H01M 2220/20* (2013.01)

(58) Field of Classification Search
None
See application file for complete search history.

(56) References Cited

U.S. PATENT DOCUMENTS

2014/0220418 A1 8/2014 Hsiao
2016/0347160 A1 12/2016 Landgraf

FOREIGN PATENT DOCUMENTS

CN 105914311 A 8/2016
CN 205723703 U 11/2016
(Continued)

OTHER PUBLICATIONS

Machine translation of DE 102015214184, Feb. 2017.*
(Continued)

*Primary Examiner* — Jonathan Crepeau
(74) *Attorney, Agent, or Firm* — Mintz Levin Cohn Ferris Glovsky and Popeo, P.C.

(57) ABSTRACT

A battery module comprising a housing defining an internal cell cavity and cells located in the cell cavity. The housing comprises two substantially parallel walls and an end structure extending between the two walls, the end structure defining an end of the housing in a first direction, the end structure being inclined with respect to the top and bottom walls such that the cell cavity extends in the first direction beyond the furthest extent of the top wall, and being configured such that the battery module can nest with a similar battery module.

18 Claims, 7 Drawing Sheets

(51) Int. Cl.
*H01M 10/625* (2014.01)
*H01M 10/643* (2014.01)
*H01M 50/107* (2021.01)
*H01M 50/213* (2021.01)
*H01M 50/258* (2021.01)
*H01M 50/262* (2021.01)

(56) References Cited

FOREIGN PATENT DOCUMENTS

| | | |
|---|---|---|
| CN | 108336271 A | 7/2018 |
| DE | 10 2012 008 633 A1 | 10/2013 |
| DE | 10 2013 013 948 B3 | 10/2014 |
| DE | 10 2013 008 589 A1 | 11/2014 |
| DE | 10 2015 214 184 A1 | 2/2017 |
| EP | 2 418 709 A1 | 2/2012 |
| JP | 2006-210359 A | 8/2006 |
| WO | WO-2020/058696 A1 | 3/2020 |

OTHER PUBLICATIONS

Machine translation of DE 102012008633, Oct. 2013.*
GB Search Report issued in GB Application No. 1815187.8, date of search Jan. 16, 2019. 5 pages.
International Search Report and Written Opinion issued in International Application No. PCT/GB2019/052609, mailed Dec. 4, 2019 (Dec. 4, 2019). 13 pages.

* cited by examiner

Side view

Top view

TRAPEZOIDAL BATTERY MODULES

This invention relates to the modules of a battery pack to be installed in a vehicle. In particular, this invention relates to battery modules for configurable vehicle battery packs.

An increasing number of vehicles are being manufactured, wherein the vehicle uses electric energy from a battery installed in the vehicle as an energy source. The vehicle could be an electric vehicle or a hybrid vehicle. Vehicles may be domestic vehicles or high power, lightweight vehicles such as supercars. It is desirable to manufacture a battery configurable to be installed in vehicles of all dimensions and shapes.

The cavity to contain the battery in some vehicles may be positioned behind one or more seats of the vehicle. Vehicle seats comprise a seat floor and a seat back, the seat floor being substantially parallel to the vehicle floor. Vehicle seats are designed to allow a driver or passenger in the vehicle to sit comfortably and hence the seat back of the vehicle seat is often not positioned orthogonally to the vehicle floor. Vehicle seat backs are often positioned obliquely to the vehicle floor so that a person sitting in the seat may be seated in an at least slightly reclined position. Batteries of the conventional shape of a cube or cuboid thus are unable to fit into a cavity behind a vehicle seat whilst utilising all the space available within the cavity.

The cavity to contain the battery in another type of vehicle may be a more regular shape of a cube or cuboid.

Hence it is desirable for a battery to be capable of being installed into a vehicle in a cavity behind one or more vehicle seats or into a cuboidal cavity.

According to a first aspect of the present invention there is a provided a battery comprising a plurality of battery modules, each battery module comprising a cell cavity containing cells and a housing defining the cell cavity. The housing comprises a top exterior wall, a bottom exterior wall and an end structure extending between the top exterior wall and the bottom exterior wall. The end structure is inclined with respect to the top and bottom exterior walls such that the cell cavity extends in the first direction beyond the furthest extent of the top exterior wall. The end structure is inclined with respect to the top and bottom exterior walls at an angle other than a right angle. In this way, the battery module is configurable to be installed into a vehicle cavity located behind one or more vehicle seats while optimising the space within the cavity.

The battery module may comprise first and second fixings, the fixings protruding from the end structure in a direction away from the cell cavity, each fixing comprising a tab defining a connection hole.

The connection hole is preferably configured to receive a fixing element for securing the battery module to another battery module.

The battery module is preferably secured to a similar battery module by one or more fixing elements.

The battery module preferably comprises a back wall extending between and joining the first and second walls, the back wall comprising an inlet opening and an outlet opening, a said inlet opening being configured for supplying coolant to the battery module and a said outlet opening being configured for draining coolant from the battery module.

The back wall may extend orthogonally between the first and second external walls and orthogonally between two other walls.

The cells may be held in a cell tray located in the cell cavity. The cell tray may be configured to act as a fluid partition, the fluid partition dividing the cell cavity into a first region and a second region, the inlet opening providing an aperture in the first region and the outlet opening providing an aperture in the second region.

A portion of the cell tray nearest the end structure may comprise through-holes and the battery module may be configured so that coolant enters the first region through the said inlet opening, flows through the first region, passes through the through-holes into the second region, flows through the second region and exits the second region through the said outlet opening.

The through-holes nearest the top exterior wall may have a first diameter, the through holes nearest the bottom exterior wall may have a second diameter greater than the first diameter and the remaining through-holes having diameters which increase with the perpendicular distance between the top exterior wall and the respective through-hole.

The exterior walls of the battery module may be composed of exterior faces of the cell tray and exterior faces of the housing.

The housing may enclose all faces of the cell tray.

The battery module may have the form of a trapezoidal prism.

The battery module may nest with a similar battery module to form a battery module block. The battery module block may have the form of a cuboid.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Battery Overview

Figure 1:
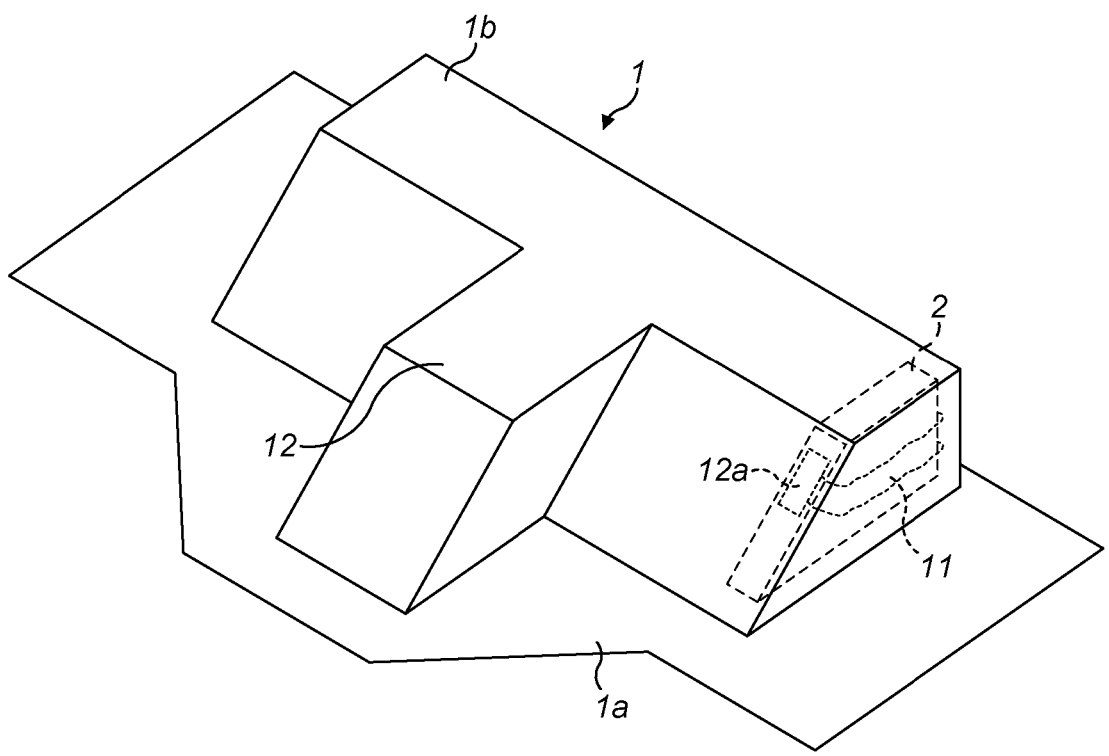
FIG. 1 shows a battery.

FIG. 1 shows a battery 1 which may comprise a number of identical battery modules 2. The battery modules may be arranged in a row. The battery may comprise any number of battery modules 2. In the example depicted in FIG. 1, one battery module 2 is shown for clarity, but in a preferred example there may be thirteen modules.

The battery may be installed in a vehicle. FIG. 1 shows the battery 1 fixed to a battery floor 1a. The battery floor 1a may be structurally integral to the vehicle in which the battery is installed. For example, the battery floor may be a load bearing component of a vehicle chassis. The battery floor 1a may be configured to be removably fitted to the vehicle so that the battery 1 can be removed from the vehicle. For example, for maintenance or replacement of the battery 1.

The battery 1 may further comprise a battery control unit 12 which protrudes from the row of battery modules. The battery control unit 12 may be electrically connected to one or more module control units 12a. Each battery module 2 may comprise an attached module control unit 12a. The battery control unit 12 may control each battery module control unit 12a. Each battery module control unit 12a may control the activity of the respective attached battery module. Each battery module control unit 12a may receive information concerning the operation of the respective attached battery module. The battery module control units 12a may process that information and feed that information to battery control unit 12.

The battery modules and battery control unit 12 may be enclosed by the battery floor 1a and a battery housing 1b.

Figure 2:
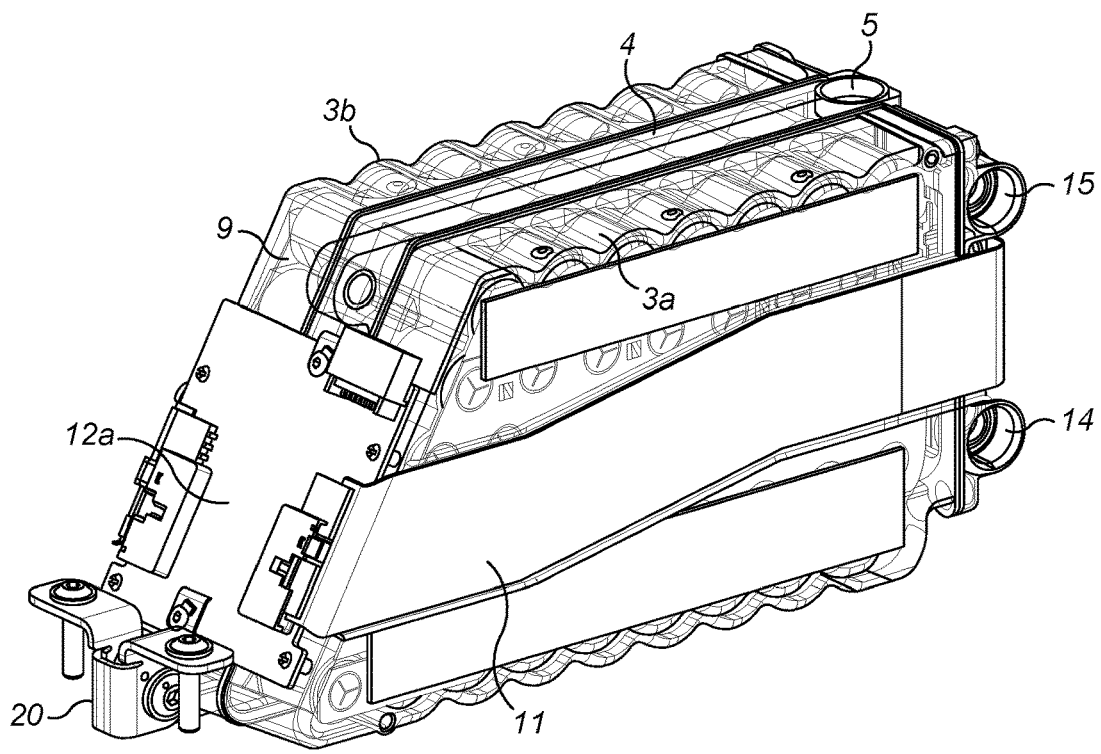
FIG. 2 shows a battery module from the front.

FIG. 2 shows a battery module 2 with a trapezoidal prism shape. The battery module depicted in FIG. 2 comprises a cell tray 4 and a two-part housing 3a, 3b. In FIG. 2, the battery module 2 and the cell tray 4 share a common longitudinal axis.

Cell Tray

Figure 4:
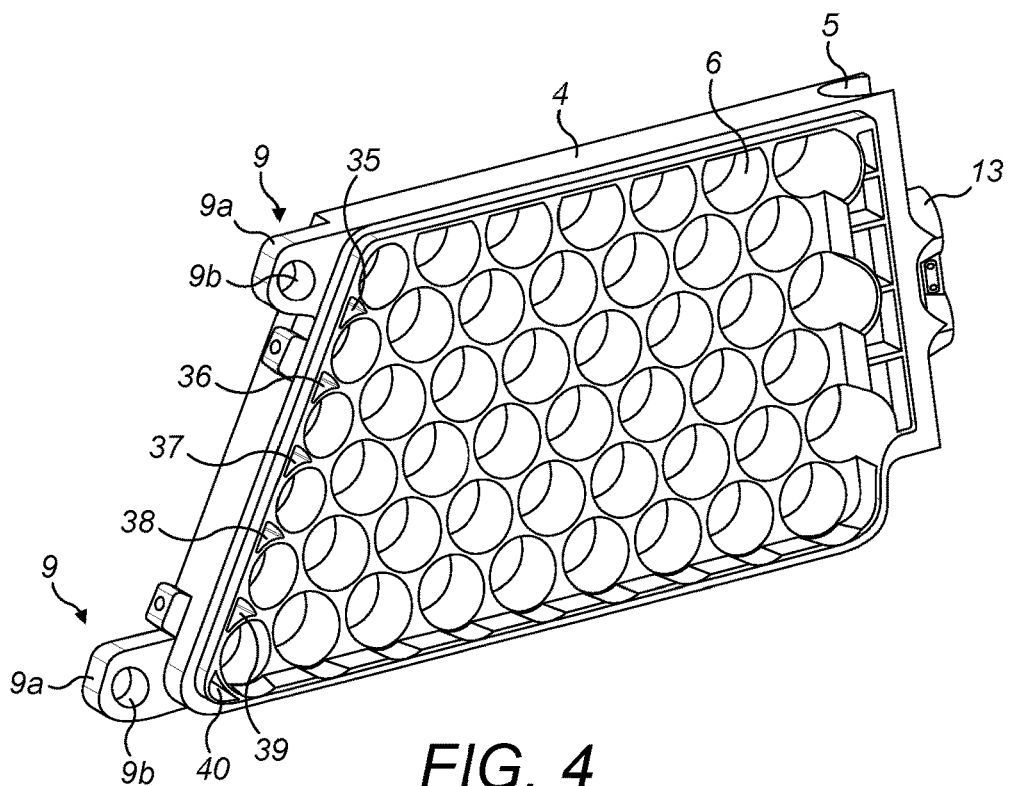
FIG. 4 shows a cell tray.

An exemplary cell tray 4 is shown in FIG. 4. The cell tray depicted in FIG. 4 comprises cell holes 6 for holding cells (not shown). Each cell hole 6 may extend through the cell tray in a direction perpendicular to the longitudinal axis of the cell tray. The cell tray may be formed of electrically insulating material.

The cell tray may further comprise a fixing hole 5 configured to receive a fixing element (not shown) for securing the cell tray 4, and hence the battery module 2, to the battery floor (not shown). As shown in FIG. 4, the fixing hole may extend through the cell tray. The fixing hole may extend through the entire length of the cell tray. The fixing hole may extend through the entire height of the cell tray. The fixing hole may extend through the entire cell tray in a direction perpendicular to the direction in which each cell hole extends through the cell tray. The fixing hole may extend through the entire cell tray in a direction perpendicular to the longitudinal axis of the cell tray.

FIG. 4 shows the cell tray 4 comprising two fixings 9, each fixing comprising a tab 9a, the tab forming a connection hole 9b. Both fixings are generally positioned in the same plane as the cell tray. Each connection hole 9b may extend through its respective tab 9a in a direction parallel to the direction in which the cell holes 6 extend through the cell tray 4. The cell tray may comprise more than two fixings. The cell tray may comprise a single fixing. Fixings on multiple battery modules may receive one or more common elements so that the battery modules can be secured to one another.

Figure 5:
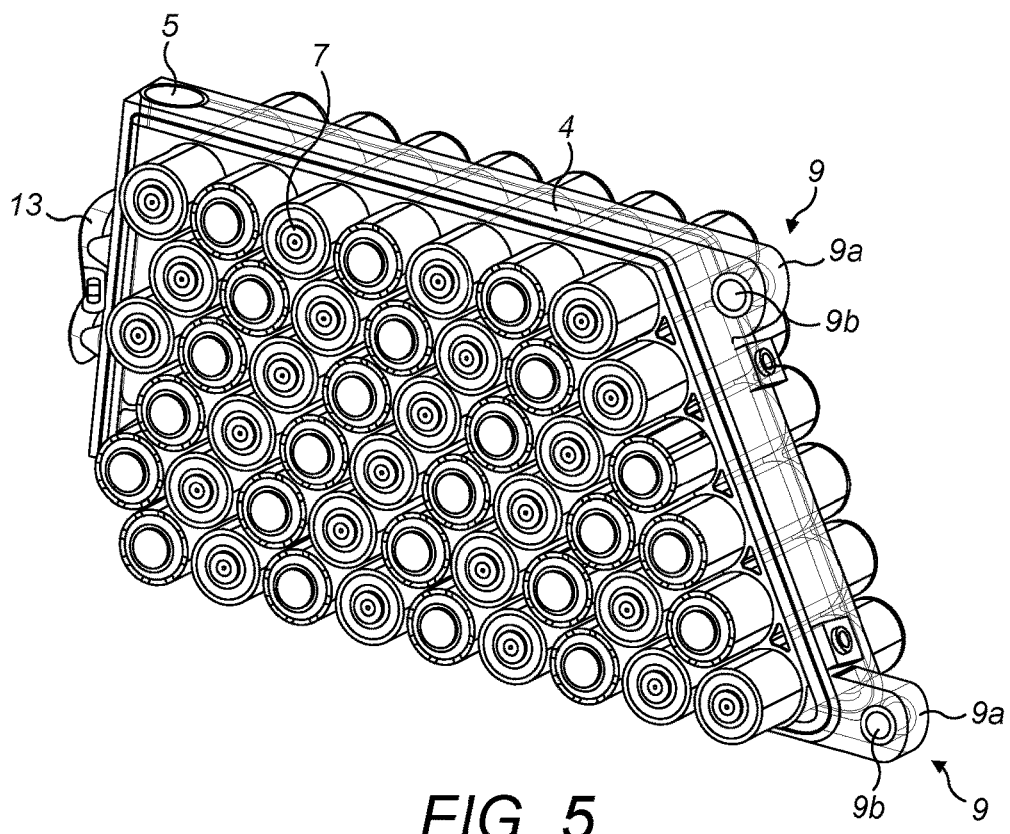
FIG. 5 shows a cell tray holding cells.

FIG. 5 shows a number of cells 7 being held in the cell holes 6 of the cell tray 4. The cell tray may be configured to hold any number of cells. In the example depicted in FIG. 5 there are forty-eight cells held in respective cell holes 6. Each cell hole may hold one cell.

Resin may be poured into a recessed side of the cell tray. The resin may harden around cells placed in the cell tray so as to secure the cells in the cell tray. Alternatively, each cell 7 may be held in a cell hole 6 by an interference fit between the cell tray 4 surrounding the cell hole and the cell inserted into the respective cell hole.

Each cell hole may extend through the cell tray in a direction perpendicular to the longitudinal axis of the cell tray. In the example cell tray depicted in FIGS. 4 and 5, each cell hole is cylindrical so as to accommodate cylindrical cells. In other examples, each cell hole may be prismatic so as to accommodate prismatic cells.

The length of each cell may be greater than the length of each cell hole. Each cell 7 comprises a positive terminal and negative terminal. When a cell 7 is inserted into a cell hole 6, a length of the cell 7 comprising the positive terminal of the cell may protrude from the cell hole on one side of the cell tray 4 whilst a length of the cell 7 comprising the negative terminal protrudes from the cell hole on the other side of the cell tray. The portion of the cell 7 comprising the positive terminal and the portion of the cell 7 comprising the negative terminal may protrude from opposite sides of the cell tray. The protruding length of the portion of the cell comprising the cell's positive terminal and the protruding length of the portion of the cell comprising the cell's negative terminal may be equal.

Figure 3:
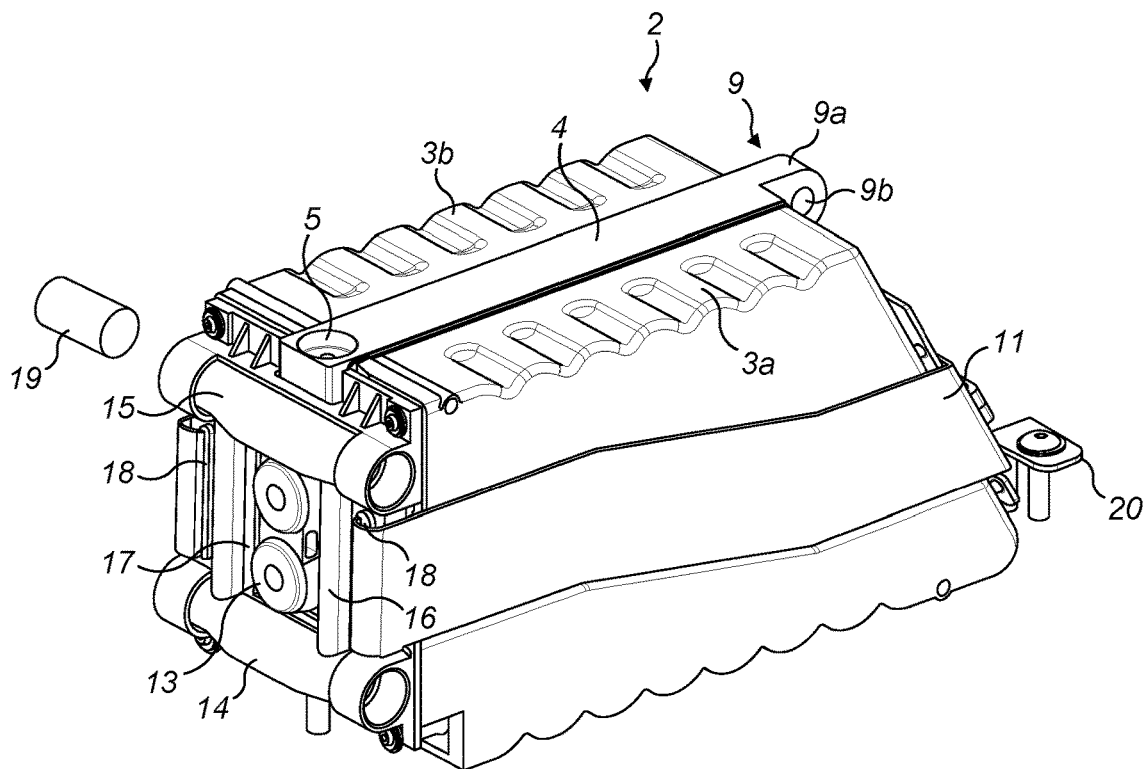
FIG. 3 shows a battery module from the back.

The battery module 2 shown in FIG. 2 comprises a two-part module housing 3a, 3b. The housing 3a, 3b may form two enclosed regions which contain the cells 7 held in the cell tray 4. In FIG. 2, one part of the module housing 3a encloses the portions of cells protruding on one side of the cell tray. The second part of the module housing 3b encloses the portions of the cells protruding on the opposite side of the cell tray. In FIGS. 2 and 3, the exterior faces of the battery module 2 comprise faces of the cell tray 4 and the housing 3a, 3b. Alternatively, the housing 3a, 3b may enclose the entirety of the cell tray. In this case, the exterior faces of the battery module would comprise faces of the housing 3a, 3b.

Cell to Cell Busbars and Flexible Printed Circuit Board

Figure 7:
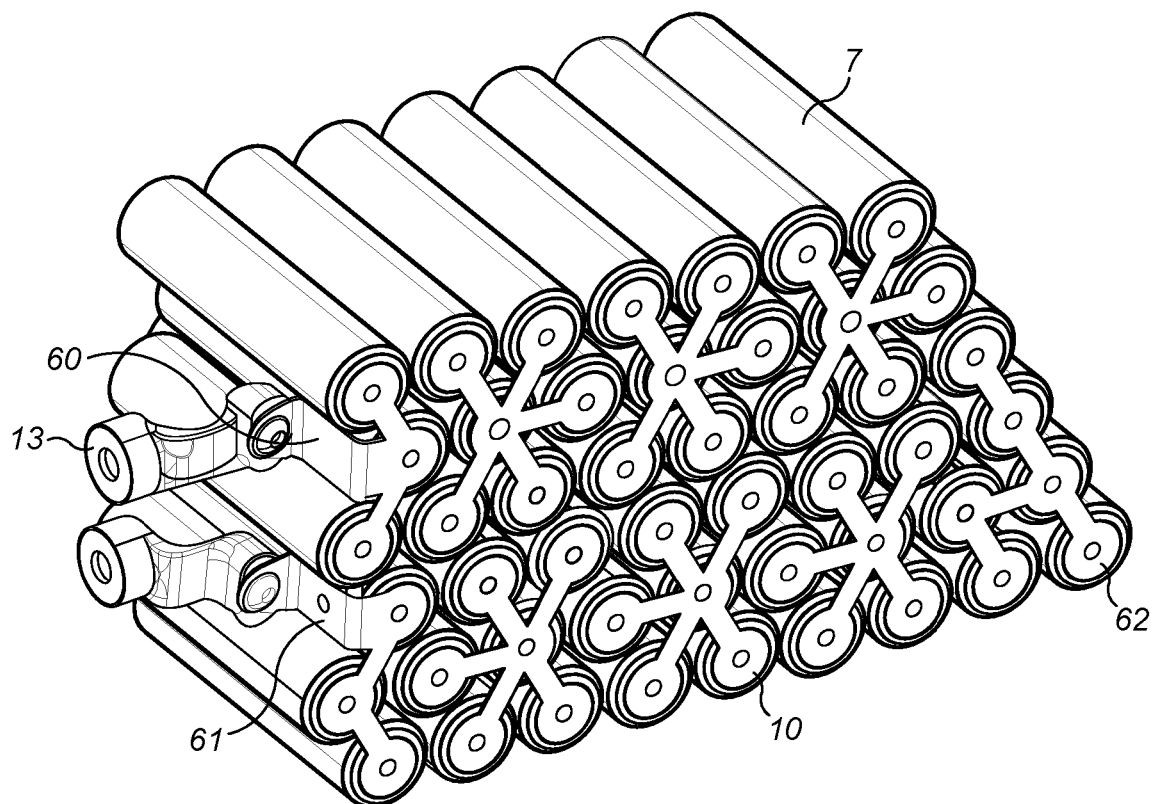
FIG. 7 shows the cells, busbars and module terminals of a battery module.

FIG. 7 shows busbars 10 contacting the terminals of multiple cells to form electrical connections between the multiple cells 7. The busbars 10 are formed of electrically conductive material. The busbars 10 may be formed of metal, for example copper or aluminium.

As above, the cell tray 4 (not shown in FIG. 7) fixedly holds cells 7, each cell having a positive terminal and a negative terminal. The busbars 10 may link the cell terminals of any number of cells.

Cells 7 may be arranged in the cell tray 4 so that positive and negative cell terminals protrude from opposite sides of the cell tray. In this way, a current flow path may be created through cells and busbars. For example, the current flow path may "snake" through the battery module. The current flow path may repeatedly intersect the cell tray. The current flow path may repeatedly intersect the longitudinal axis of the battery module. At least some of the cells may be connected in parallel by the busbars 10, meaning that the current flow path passes through multiple cells as the current flow path intersects the cell tray.

Module terminals 13 are shown in FIG. 7. The module terminals 13 are positioned on the back of the battery module and may be integral to the cell tray 4 (not shown in FIG. 7). Module terminals 13 of neighbouring battery modules may be electrically connected, for example, by module to module busbars. The module terminals 13 allow a supply of current to and/or from the cells 7 of the battery module 2.

Figure 6:
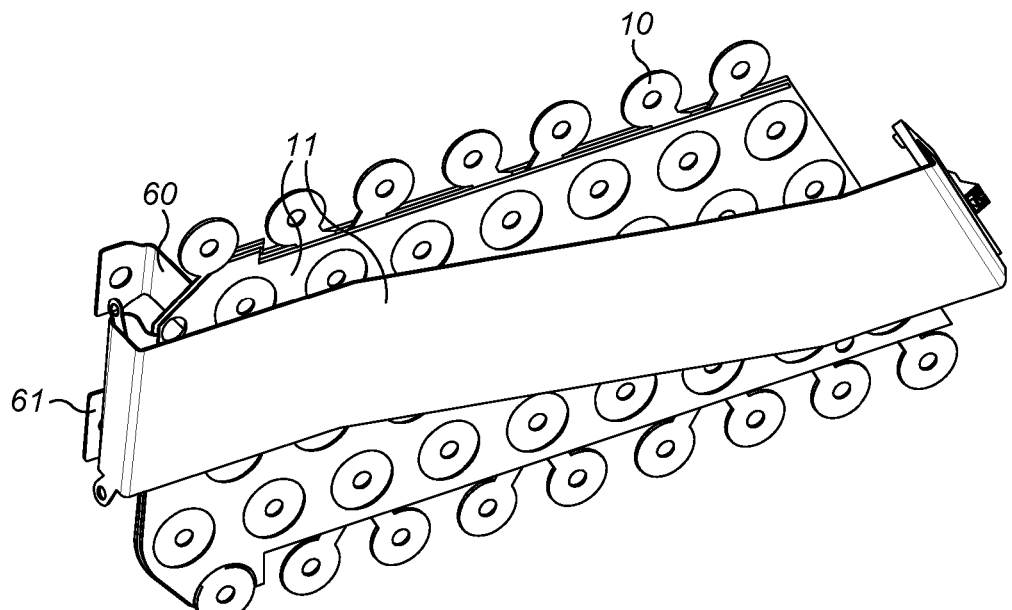
FIG. 6 shows the busbars and flexible printed circuit of a battery module.

The busbars 10 may be integrated with a flexible printed circuit board (not shown in FIG. 7). FIG. 6 shows the flexible printed circuit board 11 of a battery module. A portion of the flexible printed circuit board 11 is located in the region enclosed by the module housing and another portion of the flexible printed circuit board 11 is wrapped around the exterior faces of both parts of the two-part module housing 3a, 3b, also shown in FIGS. 2 and 3.

The busbars 10 shown in FIGS. 6 and 7 may be integrated with the flexible printed circuit board 11. The busbars 10 may be configured to conduct a high level of current between the cells of the module and the module terminals 13.

The flexible printed circuit board 11 shown in FIG. 6 may further comprise sense wires. The sense wires may be configured to conduct a low current signal. The sense wires in the flexible printed circuit board may be attached to voltage sensors. Each voltage sensor may be capable of determining the voltage at a point on the busbar. Each voltage sensor may be capable of determining the voltage being drawn from a cell. Each voltage sensor may be capable of inferring the voltage being drawn from a cell from a measurement taken of the voltage being drawn from a busbar 10. Each sense wire in the flexible printed circuit board may be capable of communicating voltage measurements from a voltage sensor to a module control unit 12a, shown in FIG. 1. The module control unit 12a may be capable of adapting the activity of the battery module in response to the voltage measurements provided by the sense wire. Each sense wire may be capable of communicating voltage measurements to the battery control unit. The module control unit 12a may be capable of communicating voltage measurements to the battery control unit. The battery control unit 12, also shown in FIG. 1, may be capable of adapting the activity of the battery module in response to the voltage measurements. The battery control unit 12 may be capable of adapting the activity of the battery in response to the voltage measurements.

The sense wires of the flexible printed circuit board 11 may be attached to one or more temperature sensors. A temperature sensor may be capable of determining the temperature of a part of the battery module. Each sense wire may be capable of communicating temperature measurements from a temperature sensor to the module control unit. The module control unit may be capable of adapting the activity of the battery module in response to the temperature measurements provided by the sense wire. Each sense wire may be capable of communicating temperature measurements to the battery control unit. The module control unit may be capable of communicating temperature measurements to the battery control unit. The battery control unit may be capable of adapting the activity of the battery module in response to the temperature measurements. The battery control unit may be capable of adapting the activity of the battery in response to the temperature measurements.

The sense wires may be attached to other types of sensors, for example current sensors, and/or fluid flow sensors.

FIGS. 6 and 7 also show terminal tabs 60, 61 which each of which connect either a positive or a negative end of the busbar to the respective positive or negative module terminal.

Module Cooling

It is known to supply coolant to regulate the temperature of batteries. In typical batteries, the coolant is confined within coolant jackets or pipes. In such batteries, cells are cooled in areas of the cell which make contact with the jacket or pipe containing the coolant. This is a slow and inefficient cooling method.

In other typical batteries, coolant is not confined by coolant jackets or pipes, but makes direct contact only with the body/centre portion of each cell. In such batteries, the cell terminals are protected so that coolant does not make contact with the cell terminals. Such contact is avoided as it would typically lead to electrical shorting. This is also an inefficient method because the cell terminals, being electrically connected, are often the hottest parts of the cell and yet they are not directly cooled by the coolant.

By contrast, in the battery module described herein, coolant supplied to the battery module 2 makes direct contact with cell terminals, flexible printed circuit board 11, busbars 10, and cell body. The entirety of the cell and connected conducting parts are bathed in coolant. That is, the entirety of the portions of each cell which protrude from the cell tray are configured to be directly contacted by coolant. The coolant used is a dielectric oil. Dielectric oils have insulating properties. Cells drenched in dielectric oil are insulated from one another preventing short circuiting between cells. This is an efficient method of regulating cell temperature. Such efficient cooling enables the cells to operate at a higher power and for longer. This means that fewer and/or smaller cells are required to generate the same power as batteries utilising the previously mentioned cooling methods.

FIG. 3 shows a supply coolant conduit portion 14 and a drain coolant conduit portion 15. In the exemplary configuration shown in FIG. 3, the supply coolant conduit portion 14 is positioned in a lower position and the drain coolant conduit portion 15 is positioned in an upper position. Such a configuration reduces the risk of air locks occurring during filling. Alternatively, the supply coolant conduit portion may be positioned in an upper position and the drain coolant conduit portion may be positioned in a lower position.

In order to fill the battery module with coolant so that components of the module can be bathed in coolant, air is first displaced. Each battery module may thus comprise an outlet for allowing air to leave the battery module. The air outlet may be referred to as a bleed port.

Both coolant conduit portions may extend along the battery module in a direction orthogonal to the longitudinal axis of the battery module. Both coolant conduit portions may extend along the battery module in a direction orthogonal to the direction in which the fixing hole 5 extends through the cell tray 4. Both coolant conduit portions may extend along the battery module in a direction parallel to the direction in which the cell holes 6 extend through the cell tray 4.

As shown in FIG. 3, the supply coolant conduit portion 14 is linked to an inlet 16 in the battery module so that coolant may be supplied to a region enclosed by the housing of the battery module. The drain coolant conduit portion 15 is linked to an outlet 17 so that coolant may be drained from a region enclosed by the housing of the battery module. Inlet 16 and outlet 17 are openings formed in the module housing. The inlet may be located in an upper position and the outlet in a lower position. Alternatively, the outlet may be located in an upper position and the inlet in a lower position. The coolant may be supplied to one of the two regions enclosed by the housing and be drained from the other of the two regions enclosed by the housing, one region being on an opposite side of the longitudinal axis of the cell tray to the other region. The cell tray 4 may comprise through-holes 35 to 40 for allowing the passing of coolant from a respective one of the said regions to the other of the said regions. The through-holes may be located in the cell tray 4 at the end of the cell tray 4 remote from the inlet 16 and outlet 17. The through-holes may be shaped to promote even fluid flow over the cells.

As shown in FIG. 1, battery 1 contains a number of battery modules 2 arranged in a row. When battery modules 2 are positioned in a row, a coolant conduit portion 14 of one battery module aligns with a coolant conduit portion of a neighbouring battery module. The two coolant conduit portions may be connected to one another by a coupler 19, shown in FIG. 3. Couplers 19 form liquid tight connections between coolant conduit portions so that coolant may flow from portion to portion. When supply coolant conduit portions 14 of the battery modules in the row of battery modules are connected by couplers 19, they form a supply coolant conduit 14a which extends along the length of the row of battery modules. When drain coolant conduit portions 14 of the battery modules in the row of battery modules are connected by couplers 19, they form a drain coolant conduit 15a which extends along the length of the row of battery modules. Alternatively, adjacent coolant conduit portions may be integral to one another such that couplers joining portions are not required. Multiple coolant conduit portions may form longer conduits which once installed cannot be split into conduit portions. A row of battery modules 2 may comprise a supply coolant conduit which extends along the length of the row of battery modules and is not divided into individual portions. A row of battery modules 2 may comprise a drain coolant conduit which extends along the length of the row of battery modules and is not divided into individual portions.

As shown in FIG. 1, the longitudinal axes of all the battery modules 2 in the row of battery modules of the battery 1, may be parallel to one another. Both coolant conduits 14a, 15a may extend along the row of battery modules in a direction orthogonal to the longitudinal axes of the battery modules in the row of battery modules. Both coolant conduits may extend along the row of battery modules in a direction orthogonal to the direction in which the fixing hole 5 extends through the cell tray 4 of each battery module. Both coolant conduits may extend along the row of battery modules in a direction parallel to the direction in which the cell holes 6 extend through the cell tray 4 of each battery module.

Inlet 16 and outlet 17 may be configured to allow coolant to enter and leave the battery module 2. Inlet 16 and outlet 17 may further act as passages through which the flexible printed circuit boards 11 pass between the interior and exterior of the battery module, as shown in FIG. 3. The inlet 16 and outlet 17 may be the only openings in the two-part housing 3a, 3b of the battery module 2. Alternatively, the battery module may comprise other inlets and outlets, for example a bleed port used to allow air to leave the battery module. FIG. 3 shows sealant 18 around the inlet 16 and outlet 17. Sealant 18 ensures that coolant inside the battery module does not leak from the battery module into other parts of the battery.

The method of direct cell cooling described herein also has further advantages in the case that excessive pressure builds up inside a cell. Each cell may comprise a cell vent port. In the case that excessive pressure builds up inside the cell, the cell vent port may be activated, allowing fluids within the cell to escape the cell. The cell vent port may be configured to expel cell fluids in the event that pressure within the cell exceeds a threshold. Upon leaving the cell, the fluids are quenched by the surrounding coolant.

Battery Module

A battery of a modular design is beneficial. Battery modules can be arranged in a variety of configurations to enable the battery to fit into cavities of different shapes and sizes. Hence the same battery modules may be used in a number of different vehicles, for example, different vehicle models in a manufacturers range of vehicles.

The battery pack described herein comprises a plurality of battery modules. The battery modules are shaped such that the battery pack is configurable. The battery modules described herein negate the need for different batteries to be designed and manufactured for installation in different types of vehicles.

Figure 8:
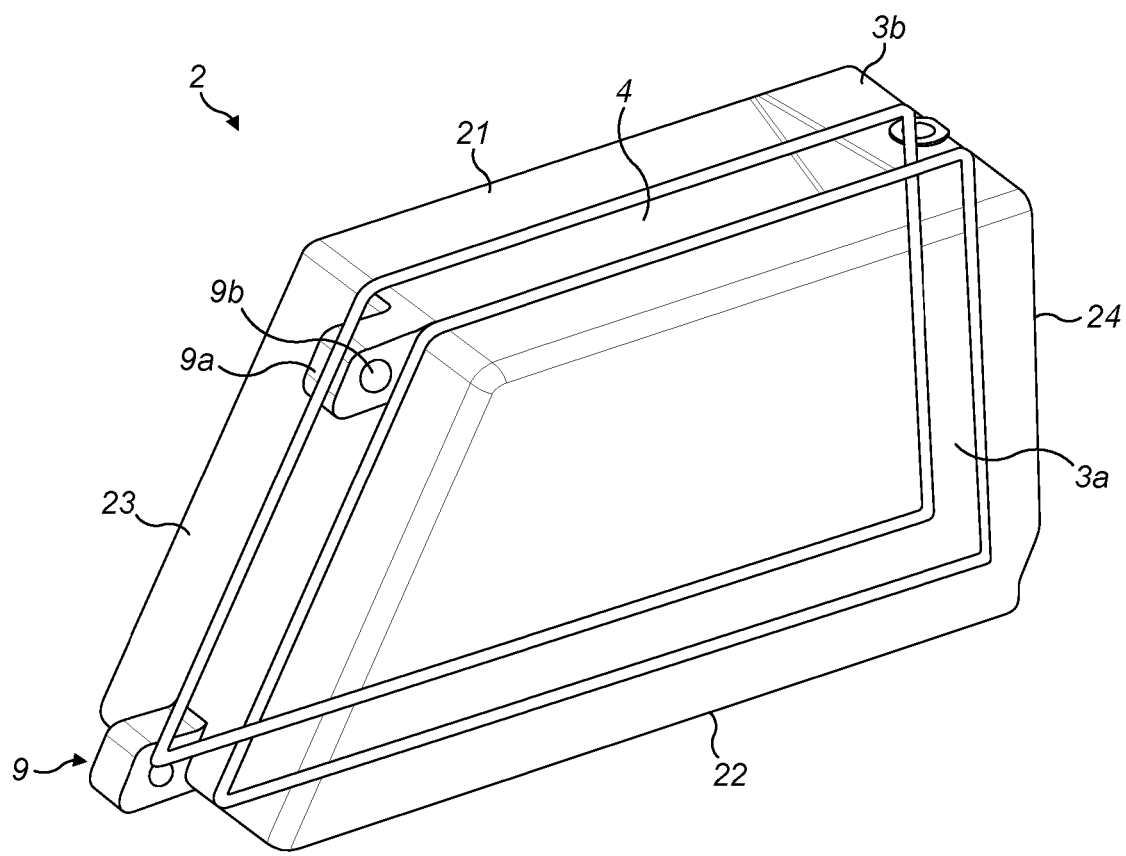
FIG. 8 shows the preferred embodiment of the form of the battery module housing.

FIG. 8 shows a battery module 2. In the example shown, the end structure 23 of the battery module comprises a single flat face extending obliquely between the top exterior wall 21 and bottom exterior wall 22. The end structure may extend obliquely between two other walls. The end structure may comprise a single face or multiple faces. Each face may have the form of a curved face. Each face may have the form of a convex face. Each face may have the form of a concave face. The end structure may comprise a face with convex portions. The end structure may comprise a face with concave portions. The end structure may have the form of a stepped structure comprising multiple faces. The end structure may comprise multiple faces, one or more of the faces being orthogonal to the top exterior wall and the bottom exterior wall.

The end structure extending between the top wall and the bottom wall defines an end of the housing in a first direction. The end structure may be inclined with respect to the top and bottom walls such that the cell cavity extends in the first direction beyond the furthest extent of the top wall. The end structure may comprise a single flat face extending obliquely between the top exterior wall and bottom exterior wall. The battery module may further comprise a back wall. The back wall may extend orthogonally between the top and bottom exterior walls and orthogonally between two other walls. The battery module may have the form of a trapezoidal prism, as depicted in FIG. 8. In the battery module shown in FIG. 8, a back wall 24 extends orthogonally between the top and bottom exterior walls 21, 22 and orthogonally between two other walls. Alternatively, the back wall may extend obliquely between the top and bottom exterior walls. The back wall may extend obliquely between two other walls. The back wall may be a curved wall. The back wall may be a convex wall. The back wall may be a concave wall. The back wall may comprise a wall with convex portions. The back wall may comprise a wall with concave portions.

The exterior walls of the battery module 2 shown in FIG. 8 are composed of exterior faces of the cell tray 4 and exterior faces of the housing 3a, 3b. The housing is a two-part housing 3a, 3b. In another example, the housing 3 may enclose the entirety of the cell tray.

Figure 9:
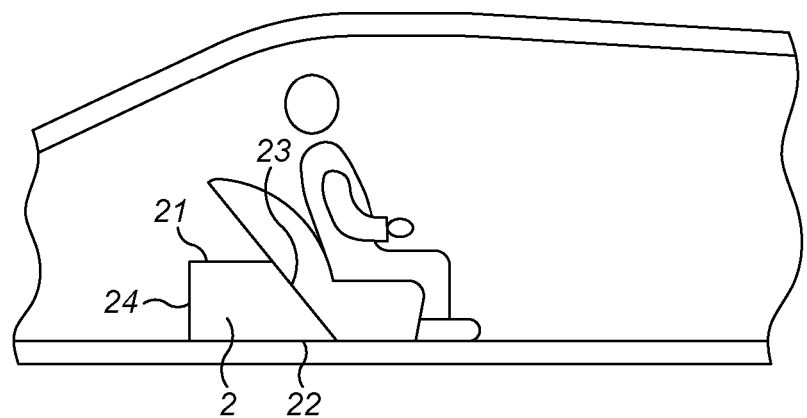
FIG. 9 shows a battery comprising battery modules installed in a vehicle cavity behind a vehicle seat.

FIG. 9 is a schematic view of a battery module 2 positioned in a vehicle cavity behind a vehicle seat. The battery module 2 may represent a row of battery modules. The bottom exterior wall 22 is substantially parallel to the vehicle floor. The end structure 23 is substantially parallel to the vehicle seat back. In the example battery module shown in FIG. 9, the end structure comprises a single flat face extending obliquely between the top exterior wall and bottom exterior wall. Alternatively, the end structure may have the form of a curved face. A battery module comprising a curved end structure may be installed in a vehicle cavity behind a vehicle seat with a curved vehicle back.

Figure 10:
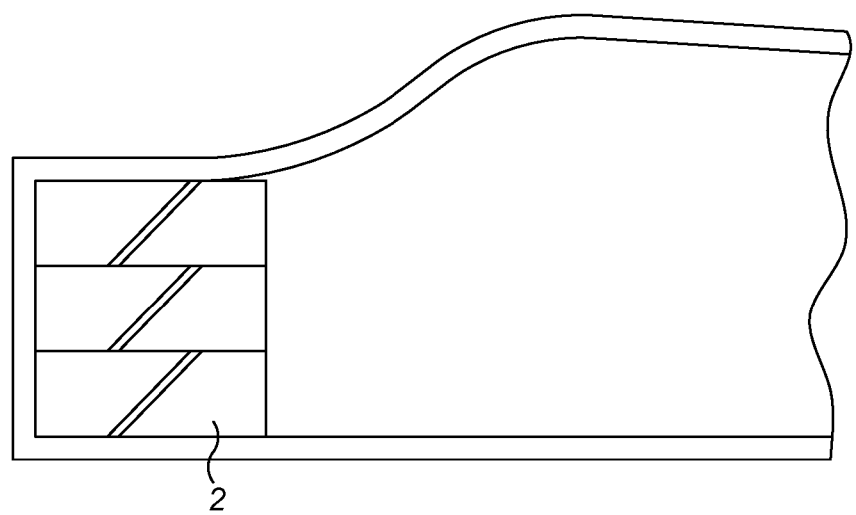
FIG. 10 shows multiple pairs of nested battery modules installed in a cuboidal vehicle cavity.

FIG. 10 is a schematic depicting pairs of nested battery modules 2 in a cuboidal vehicle cavity. Each battery module 2 shown in FIG. 10 may represent a row of battery modules. There may be multiple rows of nested battery modules. In each pair of nested battery modules, the end structure of one battery module overlaps the end structure of the similar battery module in a direction perpendicular to the top exterior wall of the battery module.

Figure 11A:
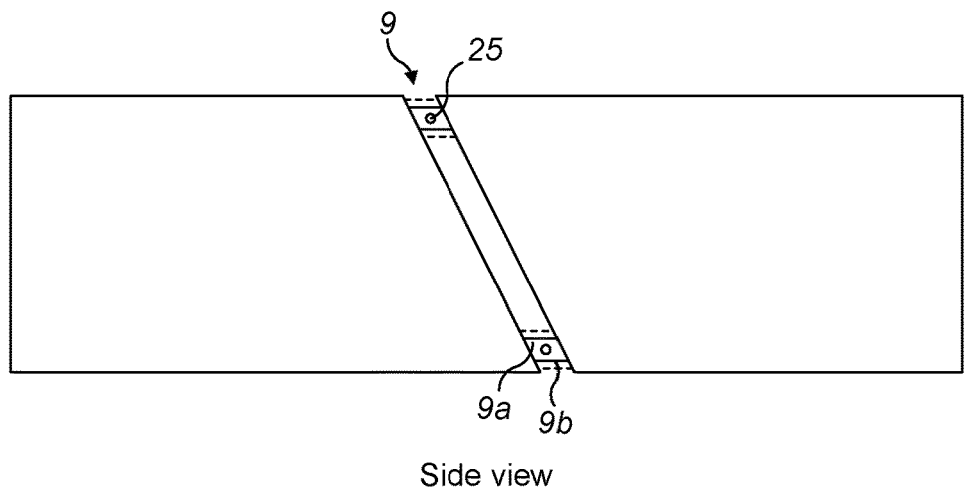
FIG. 11 shows multiple views of two battery modules forming a battery module block and secured to one another by fixing elements.
Figure 11B:
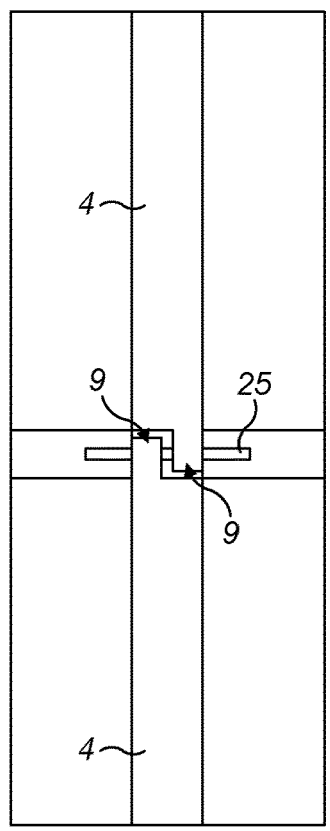

FIGS. 11a and 11b show two battery modules forming a battery module block. The two modules are secured to one another by a fixing element 25. In this exemplary embodiment, each battery module 2 comprises a cell tray 4. Each cell tray comprises two fixings 9 comprising a tab 9a and a connection hole 9b. As shown in FIG. 11a, one battery module is rotated 180 degrees about an axis transverse to the first direction. The connection holes of the fixings of the battery module are colinear with the connection holes of the fixings of the similar battery module. A fixing element 25 may be passed through the connection holes of the two battery modules so as to secure the battery modules to one another. The nested battery modules form a battery module block. The battery module block shown in FIG. 11 has the form of a cuboid.

The battery module block may alternatively have the form of a parallelogram prism. In fact, the battery module block may be any 3D shape.

As mentioned above, each battery module may comprise a bleed port. The bleed port may be configured to allow air to escape the battery module. The bleed port may be used to evacuate the battery module of air as the battery module is filled with coolant. In order for air to leave the battery module through the bleed port when the battery module is being filled with coolant, it is preferable that the bleed port is positioned at the top of the battery module. As the battery module is designed such that it can be installed into a vehicle in two orientations, each battery module may comprise two bleed ports where one bleed port may be used in each orientation. One bleed port may be positioned at the top of the battery module and a second port located at the bottom of the battery module. The two bleed ports may be located in opposite faces of the battery module. For example, one bleed port may be located in exterior wall 22 and one in exterior wall 21.

Only one bleed port may be utilised at once. According to one example, when the battery module shown in FIG. 8 is installed in an orientation with exterior wall 22 as its base, a bleed port located on exterior wall 22 may be closed (e.g. using a plug) and a bleed port located on exterior wall 21 may be left open for use. When the battery module is installed in an orientation with exterior wall 21 as its base, a bleed port located on exterior wall 21 may be closed (e.g. using a plug) and a bleed port located on exterior wall 22 may be left open for use. This has the advantage that the same battery module can be filled effectively with coolant in multiple orientations. Once the battery module is filled with coolant, both bleed ports may be closed. Both bleed ports may be closed when the battery module is installed in a vehicle.

Each battery module may be configured to nest with a similar battery module. When a battery module is nested with a similar battery module, the top exterior wall of that battery module may be parallel to the bottom exterior wall of the similar battery module and the end structure of the battery module may overlap the end structure of the similar battery module in a direction perpendicular to the top exterior wall of the battery module. The battery module block may have the form of a cuboid and may hence be installed into a cuboidal cavity—optimising use of the space within that cavity.

When the space within the cavity is optimised, the number of battery modules that can be installed in the cavity is maximised. This is due the exterior walls of the battery modules being colinear with the interior walls of the cavity allowing the battery modules to take up all available space near the interior walls of the cavity.

As described above, the back wall of the battery module comprises an inlet opening and an outlet opening. Adjoined to the back wall of each battery module may be a supply coolant conduit 14 configured to supply coolant to the first region of the battery module through the inlet and a drain coolant conduit 15 configured to drain coolant from the second region of the battery module through the outlet.

As described above, depending on the shape and size of the vehicle cavity into which the battery is to be installed, the battery modules may be arranged differently. The battery may comprise a single row of battery modules. The battery may comprise a single row of pairs of nested battery modules. The battery may comprise multiple rows of battery modules. The battery may comprise multiple rows of nested battery modules.

Each row may comprise its own supply coolant conduit and its own drain coolant conduit. Each row of battery modules may be served by its own heat exchanger. Alternatively, multiple rows of battery modules may be served by one heat exchanger.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A battery module comprising:
    a housing defining an internal cell cavity; and
    cells located in the cell cavity;
    the housing comprising:
        a top exterior wall;
        a bottom exterior wall substantially parallel with the top exterior wall; and
        an end structure extending between the top exterior wall and the bottom exterior wall and between two other walls, wherein the end structure defines an end of the housing in a first direction,
        is inclined with respect to the top exterior wall and the bottom exterior wall such that the cell cavity extends in the first direction beyond the furthest extent of the top exterior wall; and
        is configured such that the battery module can nest with a similar battery module that has been rotated about an axis transverse to the first direction with the end structure of the battery module overlapping the end structure of the similar battery module in a direction perpendicular to the top exterior wall of the battery module; and
        a back wall extending between and joining the top and bottom exterior walls and the two other walls, the back wall comprising an inlet opening and an outlet opening, said inlet opening being configured for supplying coolant to the battery module and said outlet opening being configured for draining coolant from the battery module.

2. A battery module as claimed in claim 1, wherein the battery module comprises first and second fixings, the fixings protruding from the end structure in a direction away from the cell cavity, each fixing comprising a tab defining a connection hole.

3. A battery module as claimed in claim 2, wherein the connection hole is configured to receive a fixing element for securing the battery module to another battery module.

4. A battery module as claimed in claim 3, wherein the battery module is secured to the similar battery module by one or more fixing elements.

5. A battery module as claimed in claim 1, wherein the back wall extends orthogonally between the top and bottom exterior walls and orthogonally between the two other walls.

6. A battery module as claimed in claim 1, wherein the cells are held in a cell tray located in the cell cavity.

7. A battery module as claimed in claim 6, wherein the cell tray is configured to act as a fluid partition, the fluid partition dividing the cell cavity into a first region and a second region, the inlet opening providing an aperture in the first region and the outlet opening providing an aperture in the second region.

8. A battery module as claimed in claim 7, wherein a portion of the cell tray nearest the end structure comprises through-holes and the battery module is configured so that coolant enters the first region through the said inlet opening, flows through the first region, passes through the through-holes into the second region, flows through the second region and exits the second region through the said outlet opening.

9. A battery module as claimed in claim 8, wherein the through-holes nearest the top exterior wall have a first diameter, the through holes nearest the bottom exterior wall have a second diameter greater than the first diameter and the remaining through-holes have diameters which increase with the perpendicular distance between the top exterior wall and the respective through-hole.

10. A battery module as claimed in claim 6, wherein the exterior walls of the battery module being composed of exterior faces of the cell tray and exterior faces of the housing.

11. A battery module as claimed claim 6, wherein the housing encloses all faces of the cell tray.

12. A battery module as claimed in claim 1, wherein the battery module has the form of a trapezoidal prism.

13. A battery module as claimed in claim 1, wherein the battery module nests with a similar battery module to form a battery module block.

14. A battery module as claimed in claim 13, wherein the battery module block has the form of a cuboid.

15. A battery module as claimed in claim 9, wherein the exterior walls of the battery module are composed of exterior faces of the cell tray and exterior faces of the housing.

16. A battery module as claimed in claim 9, wherein the housing encloses all faces of the cell tray.

17. A battery module as claimed in claim 4, wherein the battery module has the form of a trapezoidal prism.

18. A battery module as claimed in claim 9, wherein the battery module nests with a similar battery module to form a battery module block.

* * * * *